Dec. 31, 1968  J. A. CORNELL  3,419,891
METHYL METHACRYLATE RESIN DENTURE PLATES CONTAINING EMBEDDED
VEIN-SIMULATING SHORT-LENGTH STRANDS OF NONPLASTICIZED, LOW
SHRINKAGE FIBERS OF POLYVINYL CHLORIDE HAVING AN
AFNOR INDEX GREATER THAN 450

Filed Sept. 12, 1966

FIG.IA

MOUNDS OF GINGIVAL TONE POWDER PEARLS

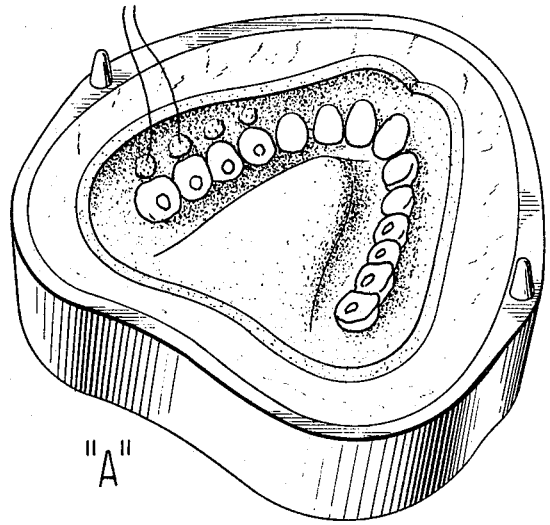

"A"

"B"

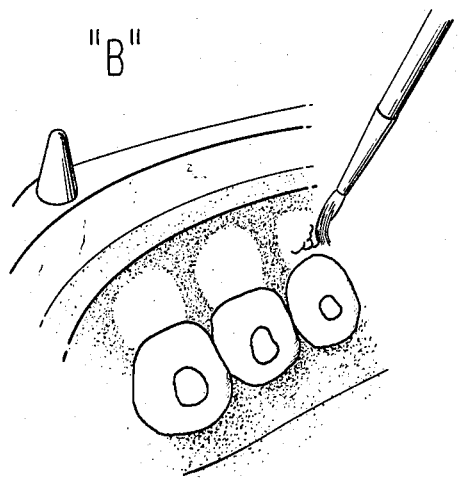

AFTER DENTURE HAS BEEN INVESTED AND THE WAX REMOVED, SEPARATE THE MOLD HALVES

APPLY LIQUID SEPARATOR TO INVESTMENT IN UPPER HALF OF MOLD

APPLY MOUNDS OF GINGIVAL TONE POWDER PEARLS AS SHOWN AT "A"

MOISTEN POWDER WITH SMALL BRUSH AND EXTEND GINGIVAL SHADING, KEEPING POWDER OUT OF INTER-PROXIMAL SPACES AS SHOWN AT "B"

"DUST" MORE GINGIVAL TONE POWDER PEARLS TO LIGHTEN LINES OF DEMARCATION

FIG. IB

INVENTOR
JOHN A. CORNELL

BY  *Abraham A. Saffitz*
ATTORNEY

"C"
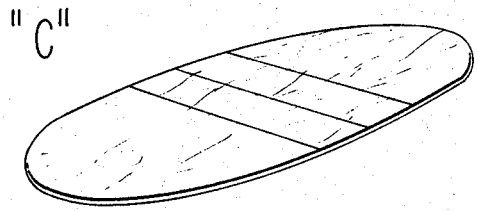
"D"
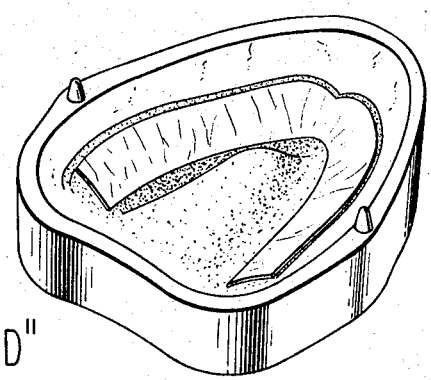
"E"
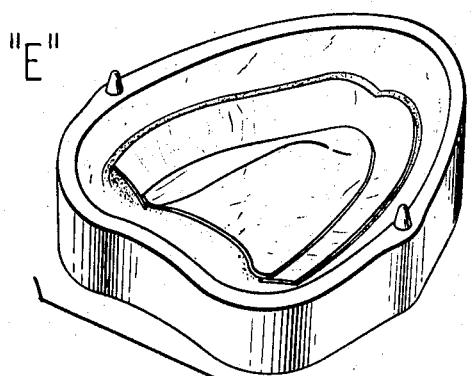
FIG.1B
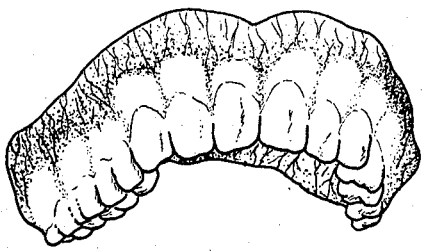
FIG.2
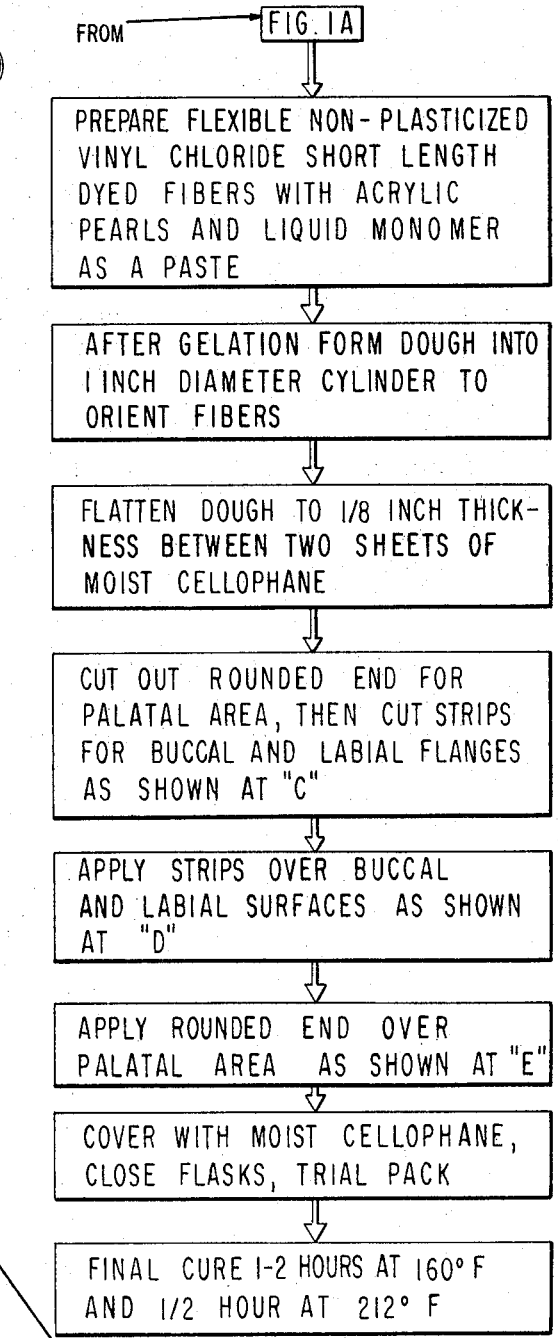

United States Patent Office 3,419,891
Patented Dec. 31, 1968

3,419,891
METHYL METHACRYLATE RESIN DENTURE PLATES CONTAINING EMBEDDED VEIN-SIMULATING SHORT-LENGTH STRANDS OF NONPLASTICIZED, LOW SHRINKAGE FIBERS OF POLYVINYL CHLORIDE HAVING AN AFNOR INDEX GREATER THAN 450
John A. Cornell, Philadelphia, Pa., assignor to Sartomer Resins, Inc., Essington, Pa., a corporation of Pennsylvania
Filed Sept. 12, 1966, Ser. No. 578,613
3 Claims. (Cl. 32—2)

ABSTRACT OF THE DISCLOSURE

A molded denture comprising a mixture of methyl methacrylate polymer and methyl methacrylate monomer in which are embedded vein-simulating short-length strands of nonplasticized fibers of polyvinyl chloride having an Afnor index greater than 450.

---

This invention relates to methyl methacrylate resin denture plates containing embedded vein-simulating short-length strands of nonplasticized, low shrinkage fibers of polyvinyl chloride having an Afnor index greater than 450 and to a method of making said plates.

The method for making the denture plates is more clearly understood with reference to the attached drawings in which:

FIG. 1A is a flow diagram on Sheet 1 of the first part of the method, the whole method being shown on the two sheets of drawings. Shown on the first sheet are the procedural and composition preparation steps for the fabrication of the laboratory dental dough used in combination with the special flexible non-plasticized vinyl chloride, short length dyed fibers having the Afnor index above 450, which result at the bottom of the first sheet of drawing in a dental flask cure carried out for initial period of 1–2 hours at the temperature of 160° F. and in the final stage at the temperature of boiling water, e.g., 212° F.

FIG. 1B continues the process on the second sheet of drawings and shows the removal of the denture plate from the laboratory flask and illustrates the application of gingival tone powder pearls of colored methyl methacrylate mixed with short-length, nonplasticized vinyl chloride fibers having an Afnor index greater than 450 to provide the desired simulation of natural gum tissue. The condition of the finished denture at the end of the flow diagram, which is shown at the bottom of Sheet 2 of the drawings is illustrated by FIG. 2.

To the left of the flow diagram at Sheet 2 of the drawing, there are shown stages of manufacture C, D and E, stage C representing an early stage of manufacture in which the dough is flattened after mixing and before curing so that it is in suitable condition for packing the mold which is to be cured in the dental flask. In this packing stage, the soft unpolymerized composition comprises a major proportion (50–65%) of polymethyl methacrylate pearls of molecular weight between 500,000 and 2,000,000 containing residual benzoyl peroxide in an amount of 0.1–0.5% by weight thereof, in the form of spheres having diameters between 0.04 and 0.2 millimeter, and of sieve distribution of 2–5% on 150 mesh, 10–55% on 250 mesh, and the remainder through 250 mesh and on 450 mesh. The other solid components which may be present include minor amounts of dental pigment, e.g., carbon black, chrome green, vermillion, mercury sulfide, cadmium red, cadmium yellow, zinc oxide, titanium oxide, iron oxide, raw umber, ultramarine blue, sienna, ochre and mixtures of these to provide desired shades of yellow (cadmium yellow), gray (carbon black), brown (sienna), blue green (ultramarine blue). Generally, from 5 to 100 milligrams total of mixed solid dental coloring matter, above-identified, mixed to the desired shade, is sufficient to provide the desired shade for 5 grams of methyl methacrylate resin powder.

An essential component of the liquid is pure liquid methyl methacrylate which has a very high solvating action at room temperature for most organic polymers. The proportion of pure methyl methacrylate monomer is generally from 25 to 40% by weight of the total composition. Another essential component is the nonplasticized vinyl chloride fiber in a short length, varying from about $\frac{3}{32}$ inch to about $\frac{7}{8}$ inch in length and from about 3 denier to about 10 denier, preferably from 8–10 denier, and in an amount of from about 0.1% to about 12% by weight of the total composition. The denier values of 3–10 and the Afnor melt viscosity index above 450 of the nonplasticized flexible vinyl chloride polymer fiber are critical in order to achieve a satisfactory resistance to breakage of the finished denture. Only the polyvinyl chloride fiber having the Afnor index above 450, and preferably between 500 and 550, as shown in Gord U.S. Patent No. 3,236,825, produces a structurally satisfactory denture which will withstand mechanical impact without breaking comparable to the same denture molded without the fibers.

It is also possible to incorporate as much as 10% by weight of nonpigmented low shrinkage fibers of polyvinyl chloride having Afnor index greater than 450, either as a nonwoven mat or as a woven mat, in order to reinforce a thin palatal area as shown in FIGURE 1B. These fibers are almost invisible and increase the impact-resistance of the palatal area without being difficult to grind and polish.

To illustrate the severe shortcomings of poor impact-resistance and poor characterization of anatomically characterized dentures embodying vein-simulting strands in the prior art, reference is made to the standard fiber materials which have been tested by the present invention, e.g., cellulose triacetate fibers, cellulose butyrate fibers, cellulose propionate fibers, polyethylene terephthalate fibers, cotton fibers, wool fibers, hexamethylene adipamide (nylon 66) fibers, polycarbonate (Delrin) fibers, regenerated cellulose fibers, polyacrylonitrile fibers, vinyl chloride-vinyl acetate copolymer (Vinyon HH) fibers, polyolefin fibers including polyethylene, polypropylene and ethylene propylene copolymers, and polybutadiene fibers. All of the foregoing fibers were incorporated into dentures in accordance with the procedure of the flow diagram of FIG. 1A herein and were tested by Izod unnotched impact test and by ordinary visual inspection and careful microscopic inspection to observe separation of the fibers, dissolving of the fibers by the methyl methacrylate monomer under conditions of mixing, thickening and preliminary curing which were selected to minimize fiber swelling and breaking due to the high solvency action of the methyl methcrylate monomer.

Of the foregoing 15 differentiated chemical structural species of fibers tested, not one was in any way comparable to the polyvinyl chloride fiber of Afnor index 540 used in the present invention and shown in the example of the Gord Patent No. 3,236,825. This polyvinyl chloride fiber was obtained from the manufacturer in two forms; the first a red dyed form which is dyed with an organic dyestuff as shown in German Patent No. 737,198 to I.G. Farben or as in German Patent No. 748,067 to F. R. Meyer. This information concenrning the dye was obtained from the manufacturer and is reported in Meilland Textile Gerichte, volume 32, in an article by Franz Kainer.

The Rhovyl fiber which is employed as the critical vein-simulating strand in the present invention exhibits its best impact-resistance at a denier of 8–10 and a denture made with it has an Izod impact of from 3 to 10 times as great as any other fiber-filled denture tested.

No fibers before the present invention have been any better than cellulose acetate which is the fiber which has been generally used in dental plates heretofore. Full plates cannot include even one-half percent of cellulose acetate fibers and still retain the impact value of the unfilled plastic because the impact value drops 50–75% of the intrinsic impact value of the plastic. The unnotched Izod value thus drops from 2.2 down to 1.0–0.5 foot-pound per inch, an impact value which is so low as to preclude its selection to improve impact in a denture employing a known nonplasticized dough formula, such as that of Cornell et al. United States Patent No. 2,947,716. This Cornell et al. patent includes examples of other known dough composition at column 3 in which the polymer is mixed with liquid monomer in weight ratios of 30:70–40:60 or wherein the bead polymer may be plasticized with 5–10% dibutylphthalate or which may also contain long-acting acrylate copolymer.

The table below summarizes testing with the above doughs and with the high impact dough of applicant's copending application U.S. Ser. No. 548,891, to demonstrate the effect of 5% fiber loading.

IMPACT TESTING OF POLYMETHYL METHACRYLATE PLATES: EFFECT OF 8-DENIER FIBROUS FILLER, PVC (AFNOR 540) AND CELLULOSE ACETATE

| Material of plate | Impact Test [1] | | |
| --- | --- | --- | --- |
| | Falling ball (percent unbroken) | Un-notched Izod [2] | Notched Izod [2] |
| (1) Unplasticized control (66:33 dough of U.S.P. 2,947,716) | 65 | 1.5 | 0.344 |
| (2) Dough 1 and cellulose acetate | 10 | 1.6 | 0.315 |
| (3) Dough 1 and PVC (Afnor 540) | 80 | 2.5 | 0.450 |
| (4) Dough 1 with bead polymer plasticized with 5% dibutyl-phthalate | 60 | 1.7 | 0.310 |
| (5) Dough 4 and cellulose acetate | 0 | 1.4 | 0.305 |
| (6) Dough 4 and PVC (Afnor 540) | 65 | 2.8 | 0.380 |
| (7) Dough of Ser. No. 548,891 containing 4–5% rubbery Buna-S copolymer | 100 | 5.8 | 0.690 |
| (8) Dough 7 and cellulose acetate | 15 | 1.8 | 0.310 |
| (9) Dough 7 and PVC (Afnor 540) | 100 | 5.9 | 0.740 |

[1] "Physical Properties of Denture Base Material," by John A. Cornell, John L. Tucker and Katherine M. Powers, the Journal of Prosthetic Dentistry, Vol. 10, No. 3, pages 515–524, May–June, 1960.
[2] In foot-pounds per inch.

After breakage, certain of the fibers can be observed with the naked eye as having separated and pulled away from the methacrylate resin matrix. Nylon fibers can be pulled out of the denture with tweezers and Dacron fibers are similar in this respect, thereby indicating very poor adhesion.

Testing with glass fibers, metal fibers and the like was started but the denture surfaces after polishing were so rough in the mouth of the patient that it appeared totally impractical to continue any development based upon the risk of mouth tumor and mouth cancer development without expensive procedure changes to recoat the denture surface after grinding.

Certain fibers, such as Vinyon HH, dissolved instantly in the paste at room temperature. Other fibers, such as acrylic and regenerated cellulose, dissolved also or broke into very small segments, apparently crazed by the monomer, so that it lost its tensile strength denier, so that the desired vein structure was not achieved in the finished denture.

Further studies were made in an attempt to improve cellulose acetate and cellulose ether fibers (ethyl cellulose) by coating these fibers with silicon resin, as in Gowman, U.S. patent application Ser. No. 241,558, filed Dec. 3, 1962, now U.S. Patent No. 3,272,766, issued Sept. 13, 1966, and entitled, "Improved Gum Simulating Anatomical Molding Composition." These coated acetate fibers failed to provide good impact-resistance and broke transversely under molding conditions to form inadequately outlined veins in the pink denture.

Other vinyl chloride homopolymer fibers which have a lower melt index, e.g., lower Afnor number, were tried and were found to be substantially equivalent to the unsatisfactory coated and uncoated plasticized vinyl chloride in that they dissolved completely or broke into small sections.

Other highly oriented polyvinyl chloride fibers were examined and found unsatisfactory due to the extreme shrinkage which occurred during the molding operation carried out first at 160° F. and then at 212° F. Certain grades of these oriented fibers illustrated substantial shrinkage above 70° C. and also appeared to be unusually susceptible to swelling attack by such ketones as acetone, esters such as ethyl acetate and mixtures of these ketones and esters with toluene. It appears, based on the solubility information, that these unsatisfactory fibers have an Afnor index value substantially less than 450 and a melting point much less than the present Rhovyl 55 fibers. The thermal characteristics of the preferred Rhovyl 55 fibers are shown in the table below.

| Characteristic: | Temperature, ° C. |
| --- | --- |
| Initial shrinkage begins | 89 |
| Sticking begins | 130 |
| Melt | 205 |

The swelling characteristics of Rhovyl 55 are as follows.

| Solvent: | Swelling |
| --- | --- |
| Acetone | None |
| Nitrobenzene | Moderate |
| Chloroform | Moderate |
| Tetrahydrofuran | Moderate |
| Cyclohexanone | Slight |
| Toluene | None |

Samples showed a Rhovyl 55 variation of tensile strength of from 2.7–3 grams per denier, wet or dry, an elongation of from 12–20%, wet or dry, and a specific gravity of 1.4.

After the fibers, acrylic pearls and liquid monomer are mixed in paste form, the paste is gelled with the fibers oriented and is flattened. Parts of the flattened dough are cut along the horizontal lines shown in C of FIG. 1B. These cut parts and strips are packed in the form shown in D of FIG. 1B. In this way the buccal and labial areas are covered. In the view shown as E in FIG. 1B, the palatal area is covered with the vein-simulating dough piece. The trial pack with moist cellophane cover is run, e.g., the closing of the mold parts is tested to assure proper fit, the cellophane is removed and the cure is carried out in the conventional dental flask under special temperature and time curing conditions of stage A, ½ hour cure at 160° F. and stage B, ½ hour cure at 212° F.

The finished denture containing the PVC fibers of Afnor index greater than 450 is shown in FIG. 2 of the drawing. The finished denture of the present invention possesses the impact characteristics demonstrated in the table of impact testing hereinabove. In comparison with the best characterizing material used in the prior art, e.g., cellulose acetate, the unplasticized dough plate, plasticized dough plate (5% DBP) and high impact dough plate values each show 7–8 times greater resistance to impact by the falling ball test under the same conditions of fiber loading for the PVC fibers of the invention. The falling ball test is an index of the resistance of the finished plate, as shown in FIG. 2, to rapid fracturing blows to which the plate may be subjected during its manipulations in and out of the mold and during grinding, buffing and polishing operations, and in use.

The unnotched Izod values for the plates embodying the PVC fibers of the invention are more than 1½ times greater than the values for the cellulose acetate filled plates in the plasticized (materials 4-6 of the table) and unplasticized (materials 1-3 of the table) dough embodiments. The special impact dough compositions (materials 7-9 of the table) show unnotched Izod values which are 3.3 times greater when filled with PVC fiber than when filled with cellulose acetate fiber.

When the PVC fibers were wetted with silicone, e.g., DC-200 silicone oil having a viscosity of 50 centipoises at 20° C. and consisting essentially of di-lower alkyl siloxane, as shown in the copending Gowman application, U.S. Ser. No. 241,558, filed Dec. 3, 1962, the falling ball, unnotched Izod and notched Izod data fell to about the values for the cellulose acetate fiber-filled plates. In short, the cellulose acetate or PVC fiber coated with silicone material of the Gowman application Ser. No. 241,558, is suitable mainly for anatomical characterization, especially by hand operation, and does not provide an impact-resistant molded denture product as with the uncoated PVC of Afnor index greater than 450.

Denture plates of the type illustrated in FIG. 2 herein are very resistant to breaking when accidentally dropped at home, in the bathroom or in the dental laboratory. The high unnotched Izod values in the table hereinabove signify to those skilled in the art the superiority of the special PVC-filled dentures or parts (PVC Afnor index greater than 450) when made in small dimensions. Further, the notched Izod values signify to those skilled in the art what can be expected in plates containing the PVC fibers when these plates are made in larger dimensions, as full dentures, and in dentures with irregular surfaces. An example of the latter is the frenial notch (at the frenium behind the upper lip) and the intersection of a central porcelain tooth and the denture. Breakage most frequently occurs at this location. It is surprising indeed to find that the only fiber which minimizes this breakage, while maintaining its integrity and appearance as a fiber in the molded denture as shown in FIG. 2, is nonplasticized uncoated PVC fiber having an Afnor index greater than 450. These surprising advantages are not demonstrated by any other commercial fibers nor any other fibers known to the inventor.

The commercial fibers found by the present inventor to be unsatisfactory include cellulose triacetate, cotton, wool, nylon, caprolactum, silk, glass, polypropylene, polyethylene, propylene-ethylene copolymer, polyacrylonitrile (Orlon), polycarbonate (Delrin), polyethylene terephthalate (Dacron), polyvinylidene chloride (Saran), polyurethane (spandex), Hevea rubber fibers, butadiene-styrene rubber fibers, neoprene fibers and the like. None of these commercial fibers are as good as cellulose acetate tested herein.

Further, the present inventor has tested experimental fibers based upon cross-linked insolubilized acrylate ester polymers and methacrylate ester polymers and copolymers and has found none of these to be satisfactory because they either quickly dissolved in the liquid monomer component of the dough or they fractured under the conditions of molding as outlined in FIG. 1A herein. In instances where the experimental acrylic fiber was found to resist fracture and to resist the solvent action of the dough, the impact values were no improvement over cellulose acetate.

I claim:
1. A molded methyl methacrylate resin denture plate comprising a polymerized mixture of methyl methacrylate polymer and methyl methacrylate monomer in which there is embedded from about 0.1% to 10% by weight of vein-simulating short-length strands of nonplasticized fibers of polyvinyl chloride having an Afnor index greater than 450, said polyvinyl chloride fiber having a length between 3/32 and 7/8 inch and being from 3 to 10 denier.

2. A molded denture plate as claimed in claim 1, wherein said methyl methacrylate polymer in said mixture is plasticized with about 5% of dibutylphthalate.

3. A molded denture plate as claimed in claim 1, wherein said mixture contains 3-4% of alkaline-washed rubbery 70 parts butadiene-30 parts styrene copolymer in a particle size of 0.1-10 microns, said particles being coated with polymerized methyl methacrylate.

References Cited
UNITED STATES PATENTS

| | | | |
|---|---|---|---|
| 2,532,502 | 12/1950 | Joy | 260—884 |
| 3,236,825 | 2/1966 | Gord | 260—92.8 |
| 3,272,766 | 9/1966 | Gowman | 106—35 |

MORRIS LIEBMAN, *Primary Examiner.*

L. T. JACOBS, *Assistant Examiner.*

U.S. Cl. X.R.

260—31.8, 41, 884, 885, 899, 901